United States Patent
Hiraoka et al.

(10) Patent No.: US 8,219,161 B2
(45) Date of Patent: Jul. 10, 2012

(54) PORTABLE TERMINAL

(75) Inventors: Michiaki Hiraoka, Kanagawa (JP); Hiroshi Tsukiji, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 478 days.

(21) Appl. No.: 12/088,675

(22) PCT Filed: Sep. 29, 2006

(86) PCT No.: PCT/JP2006/319521
§ 371 (c)(1),
(2), (4) Date: Sep. 30, 2009

(87) PCT Pub. No.: WO2007/037404
PCT Pub. Date: May 4, 2007

(65) Prior Publication Data
US 2010/0016040 A1    Jan. 21, 2010

(30) Foreign Application Priority Data

Sep. 29, 2005   (JP) .................................. 2005-285663

(51) Int. Cl.
*H04M 1/00* (2006.01)

(52) U.S. Cl. ............... 455/575.4; 455/575.5; 455/575.3; 455/556.1; 343/763; 343/880; 343/883; 343/702

(58) Field of Classification Search ................ 455/575.4
See application file for complete search history.

(56) References Cited

U.S. PATENT DOCUMENTS

| 7,092,747 B2 * | 8/2006 | Park et al. | 455/575.4 |
| 7,286,089 B2 * | 10/2007 | Lee et al. | 343/702 |
| 7,813,776 B2 * | 10/2010 | Lee et al. | 455/575.4 |
| 2005/0052837 A1 * | 3/2005 | Kota et al. | 361/683 |
| 2006/0056141 A1 * | 3/2006 | Pihlaja et al. | 361/683 |
| 2006/0145932 A1 * | 7/2006 | Lim | 343/702 |
| 2007/0265031 A1 * | 11/2007 | Koizumi et al. | 455/556.1 |

FOREIGN PATENT DOCUMENTS

| JP | 2002-009920 | 1/2002 |
| JP | 2002-111835 | 4/2002 |
| JP | 2003-179678 | 6/2003 |
| JP | 2005-167488 | 6/2005 |
| JP | 2005-167847 | 6/2005 |
| JP | 2005-191875 | 7/2005 |
| JP | 2006-005409 | 1/2006 |
| WO | 2004/080039 | 9/2004 |

* cited by examiner

*Primary Examiner* — Marivelisse Santiago Cordero
*Assistant Examiner* — Jean Chang
(74) *Attorney, Agent, or Firm* — DLA Piper LLP (US)

(57) ABSTRACT

A portable terminal, which is small sized, excellent in portability, and having high operability for various functions other than a call function, is provided. Two housings are connected such that they can be extended in directions different from each other. The housings have a retraction state, a first extension state, a second extension state, and a third extension state that is a state achieved by further sliding the housings from the second extension into another state. Broadcast receiving conditions are improved by changing the length of an antenna for receiving digital broadcast reception in the second extension state and the third extension state.

1 Claim, 28 Drawing Sheets

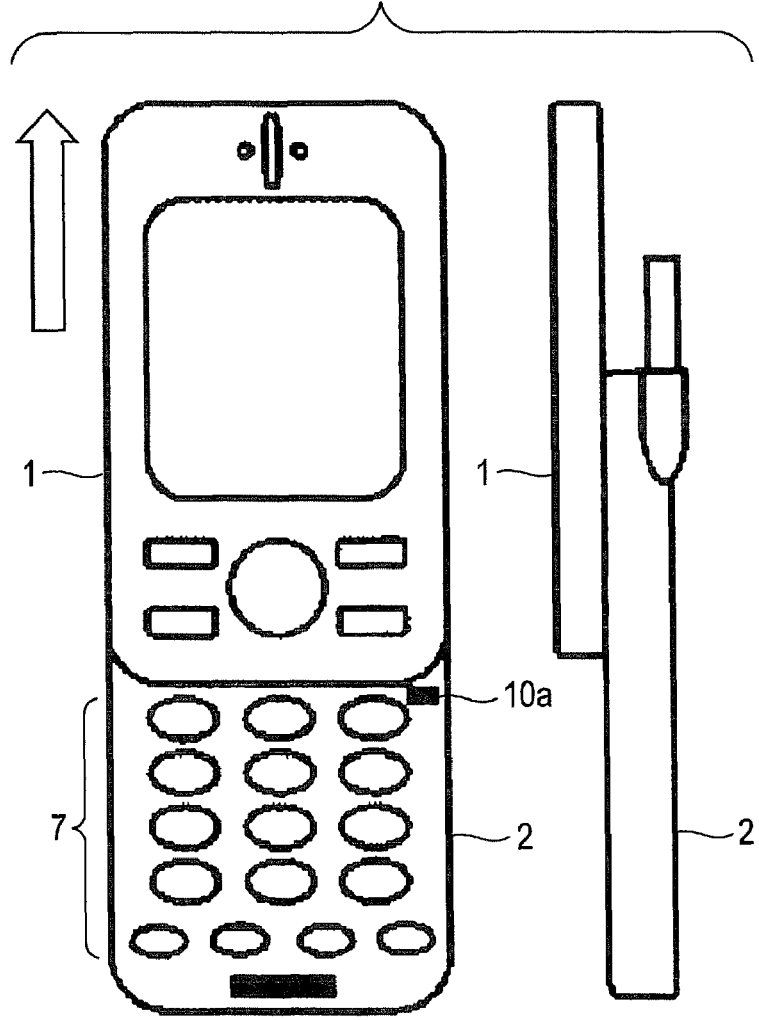

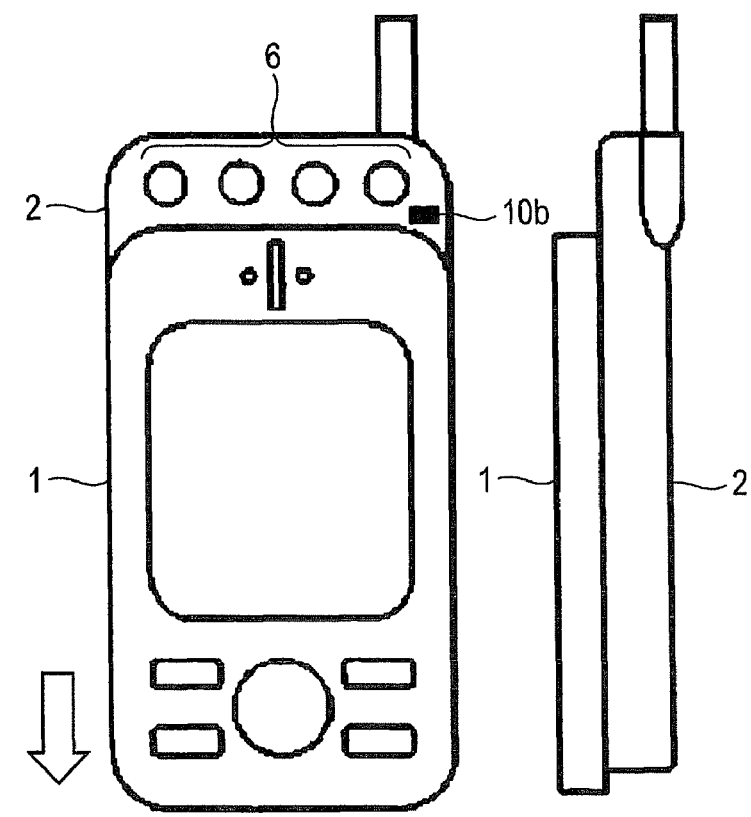

20

PORTABLE TERMINAL

TECHNICAL FIELD

The present invention relates to a portable terminal, for example, represented by a portable telephone, and more particularly to a portable terminal in which two housings have a movable mechanism.

BACKGROUND ART

Recently, with the rapid improvement of included functions, a portable telephone serving as a portable terminal is developing from the position of a portable telephone dedicated for a simple call to the position of a portable information terminal represented by PDA (Personal Digital Assistants).

An example of high functionality of the portable telephone is a camera function equipped with an image pickup device. For example, a photography function of high image quality of more than one million pixels, a video recording function, a video telephone function, and the like are possible. Moreover, a portable telephone with a television in which a tuner for an analog TV is embedded exists in the markets, and in the near future, it is expected that a portable telephone for digital broadcasting will be commercialized.

The portable telephone in which the TV tuner is embedded is disclosed in the following Patent Document 1.
Patent Document 1: Japanese Unexamined Patent Application Publication, First Publication No. 2002-9920

From the viewpoint of convenience upon carrying, the miniaturization of the portable telephone is rapidly progressing. On the other hand, to satisfy the demand for a large-sized display screen according to function improvement, in the mainstream of recent portable telephones, the portable telephones has a structure in which two different housings of a first housing mainly having a display screen and a receiver and a second housing mainly having an operation key and a transmitter are slidably coupled. In particular, a portable telephone having a slide-type sliding mechanism is attracting attention, in which a large-sized LCD (liquid crystal screen) can be always exposed to be visible in a state in which the housing is closed and information can be viewed or received even in a state in which the housing is not open.

DISCLOSURE OF THE INVENTION

Problem that the Invention is to Solve

By the way, the recent portable telephones have the high functionality as described above, but have a problem in that the operability of a user may be not necessarily sufficient for the high functionality.

That is, since the portable telephone does not originally have an optimum form for additional functions such as a camera function, a digital broadcast reception function, and the like, the operability of an operation key or the like is complicated when the transition from the call function to these additional functions is made.

For example, since the potable telephone has a limitation in a total size from the viewpoint of portability, a dedicated operation key may not be provided for an additional function of which the use frequency is low. Therefore, other operation keys used for a primary call function are assigned only when additional functions are performed, or the additional functions are to be called through some steps from a menu screen, such that the operability is complicated.

When two-way services such as the participation in a quiz program or a game, TV shopping, and the like are performed through a corresponding digital broadcast in digital broadcast reception, an input operation at a viewer side is required to use the services, but it is necessary to newly provide an operation key of a color button or the like to use the two-way services by means of the portable telephone.

A color button function may be added to the operation key of the conventional portable telephone, but the operability is complicated and therefore the use is very difficult. When a completely new color button or the like is provided, a placement position significantly affects the operability and a whole housing size of the portable telephone in which operation keys including the color button are arranged is limited from the viewpoint of portability.

Therefore, a very important problem is that an operation key for an additional function is arranged in a housing of a portable terminal such that its operability is not complicated.

The present invention has been made in view of this situation, and an object thereof is to provide a portable terminal that is small-sized and excellent in portability and has high operability for various functions other than a call function.

Means for Solving the Problem

To achieve the above-mentioned object, the present invention is a portable terminal including: a first housing on which a display screen is exposed and arranged; a second housing including at least a plurality of operation keys; a sliding unit that forms a retraction state in which a whole form is retracted and a plurality of extension states extending in a plurality of different directions from the retraction state, by sliding the second housing with respect to the first housing; and an extension state further extended in the same direction from the extension states, wherein antenna lengths of an antenna are configured to be different in the extension states and the extension state further extended in the same direction from the extension states.

Preferably, different operation keys among the plurality of operation keys are exposed in the extension states.

Preferably, an operation key to be exposed in the extension states is an operation key to be used for a broadcast application.

To achieve the above-mentioned object, the present invention is a portable terminal including: a first housing on which a display screen is exposed and arranged; a second housing including at least a plurality of operation keys; and a sliding unit that forms a retraction state in which a whole form is retracted, a first extension state extending in a first direction from the retraction state, and a second extension state extending in a second direction different from the first direction from the retraction state, by sliding the second housing with respect to the first housing, wherein different operation keys among the plurality of operation keys are configured to be exposed in the first extension state and the second extension state.

Preferably, an operation key to be exposed in the second extension state is an operation key to be used for a broadcast application.

Advantage of the Invention

According to the present invention, a portable terminal is small-sized and excellent in portability and has high operability for various functions other than a call function.

DESCRIPTION OF REFERENCE NUMERALS AND SIGNS

1: FIRST HOUSING
1a: BACKSIDE OF FIRST HOUSING
11: FIRST SLIDE RAIL
12: SECOND SLIDE RAIL
13: RAIL GROOVE
101: FIRST ANTENNA ELEMENT
3: DISPLAY UNIT
4: SPEAKER
5: SUB KEY OPERATION UNIT
2: SECOND HOUSING
2a: FRONT SIDE OF SECOND HOUSING
201: SECOND ANTENNA ELEMENT
14: FIXED PIN
15: MOVABLE PIN
16: CONCAVE PORTION
17: SLIDING HOLE
18: ELASTIC MEMBER
19: DROPOUT PREVENTION PLATE
6: COLOR BUTTON OPERATION UNIT
7: KEY OPERATION UNIT
8: MICROPHONE
9: ANTENNA
10a, 10b: OPTICAL SENSOR
20: IMAGE PICKUP UNIT
21: CAMERA OPERATION BUTTON
22: CONTROL UNIT
29: DEMULTIPLEXING UNIT
30: HOUSING STATE DETECTION UNIT
23: RADIO UNIT
24: MEMORY
25: TUNER
26: DEMODULATION UNIT
27: VOICE PROCESSING UNIT
28: IMAGE PROCESSING UNIT

BEST MODE FOR CARRYING OUT THE INVENTION

Hereinafter, a portable telephone corresponding to one embodiment of a portable terminal having a broadcast reception function as a portable terminal of the present invention will be described with reference to the accompanying drawings.

Figure 1:
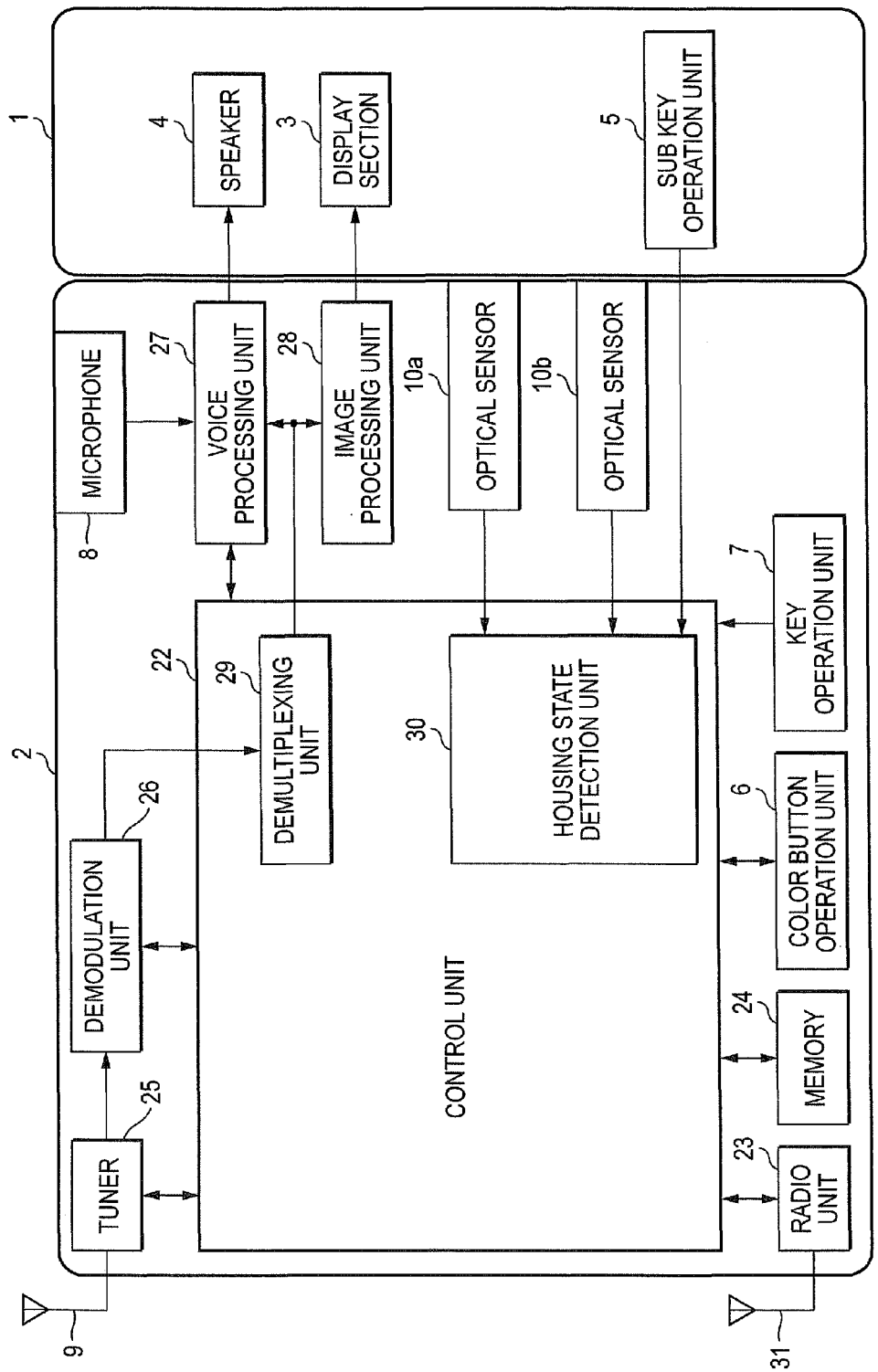
FIG. 1 is a circuit block diagram showing one configuration example of a portable telephone of the present embodiment.

FIG. 1 is a circuit block diagram showing one configuration example of a portable telephone of the present embodiment.

As described below, the portable telephone of the present embodiment is a slide-type portable telephone in which two housings of a first housing 1 and a second housing 2 are connected so as to be slidable each other. In FIG. 1, elements of circuit blocks assigned to each housing of the first housing 1 and the second housing 2 are shown.

Hereinafter, components configuring the circuit blocks will be described.

A radio unit 23 is configured by including a transmit/receive antenna, and modulates and transmits voice information, electronic mail, or the like processed in a control unit 22 to a base station (not shown) via a transmit/receive antenna 31 so as to perform radio communication using radio waves.

Moreover, the radio unit 23 demodulates various information such as electronic mail, voice information, and the like wirelessly transmitted from the base station and received by the transmit/receive antenna 31, and outputs the information to the control unit 22.

A memory 24 is configured by including a nonvolatile memory such as EEPROM or the like, and stores application programs (functions) for executing various applications provided in the portable telephone of the present invention as well as a control program for transmitting and receiving a call or mail, a digital broadcast, an Internet browser, message data, and an address book in which a name and a telephone number are registered. For example, in order to activate an application, the control unit 22 loads an application program stored in the memory 24 to a RAM region.

A key operation unit 7 is configured by including a plurality of operation keys arranged in the second housing 2. The plurality of operation keys include a plurality of operation keys required for a call function such as an end (call end)/power key, a start (calling) key, and operation keys corresponding to numbers and the like. Input information from a user is output to the control unit 22 via these operation keys.

A color button operation unit 6 is configured by including an operation button to be used for a two-way service of a digital broadcast. This operation button is used for only the digital broadcast.

A sub key operation unit 5 is configured by including a plurality of operation keys arranged in the first housing 1. For example, in a retraction state (a state in which the whole housing is smallest) described below, an operation key is included to be used for a simple function for displaying electronic mail text received by the user, or the like.

A transmit/receive antenna 9, a tuner 25, a demodulation unit 26, and a demultiplexing unit 29 within the control unit 22 configure a function for receiving a digital television broadcast (hereinafter, digital broadcast), and a reception, image display, and voice output of the digital broadcast are controlled by the control unit 22.

That is, a signal received by the transmit/receive antenna 9 from a broadcasting station (not shown) is OFDM demodulated in the demodulation unit 26 and is extracted as transport stream data (TS data) after a user desired channel (frequency band) is selected in the tuner 25.

The demultiplexing unit 29 mainly separates the extracted TS data into image data and voice data.

In the digital broadcast, a two-way service of game participation, TV shopping, or the like is performed. Alternatively, when a signal is transmitted from the portable telephone related to the embodiment to the base station, the signal is modulated by the control unit 22 and is transmitted via the transmit/receive antenna 31.

An image processing unit 28 displays an image on an LCD of a display unit 3 by driving the display unit 3 on the basis of the separated image data. Moreover, the image processing unit 28 can display not only a digital broadcast image, but also a so-called standby screen, a telephone number, or the like according to the call function on the display unit 3.

A voice processing unit 27 performs a predetermined process of a filtering process or an encoding process for the user's voice sound collected from a microphone 8 to generate voice data. For example, the generated data is transmitted for a call to the base station (not shown) via the radio unit 23 and the transmit/receive antenna 31.

Moreover, the voice processing unit 27 amplifies voice data received via the transmit/receive antenna 31 and the radio unit 23 or voice data separated by the demultiplexing unit 29, and outputs a voice to a speaker 4.

Optical sensors 10a, 10b are configured by including an optical detection element such as a photodiode attached to a surface of the second housing 2. For example, when light is irradiated, the photodiode is in a conductive state, such that an amount of irradiated light is detected by detecting a current across the photodiode.

A housing state detection unit 30 configuring part of the control unit 22 detects a housing state (form) changed by a sliding mechanism on the basis of light amounts detected by the optical sensors 10a, 10b. A detection principle of the housing state detection unit 30 will be described below.

The housing state detection unit 30 is one embodiment of detection unit of the present invention.

The control unit 22 serving as control unit of the present invention is mainly configured with a microcomputer and performs the overall control of the portable telephone related to the embodiment. For example, the control unit 22 performs control of wireless transmission and reception of various information in the radio unit 23, voice information processing for the voice processing unit 27, information display control for the display unit 3, processing according to input information from the key operation unit 7 and the sub key operation unit 5, access control for the memory 24, and the like.

In particular, the control unit 22 related to the present embodiment activates different application programs according to detection results of the housing state detection unit 30. The application programs are the above-described digital broadcast application, and the like.

Subsequently, a form of the portable telephone related to the embodiment will be described.

Figure 2:
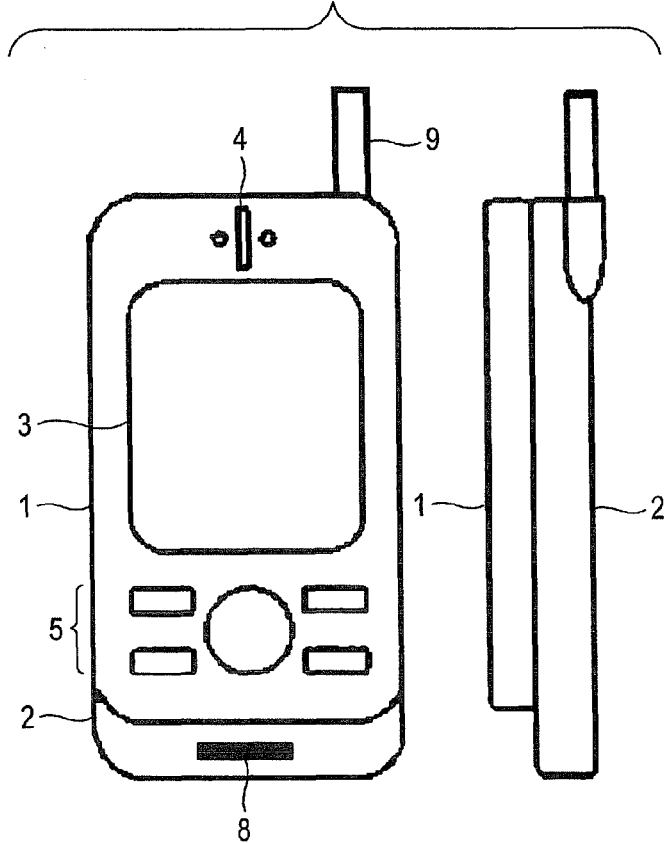
FIG. 2(a) is a front view and a side view of a form capable of being formed by a portable telephone related to the present embodiment according to a connection state of a first housing and a second housing, and shows a retraction state.
FIG. 2(b) is a front view and a side view of a form capable of being formed by a portable telephone related to the present embodiment according to a connection state of a first housing and a second housing, and shows an extension state extended in one direction.
FIG. 2(c) is a front view and a side view of a form capable of being formed by a portable telephone related to the present embodiment according to a connection state of a first housing and a second housing, and shows an extension state extended in a direction different from that of FIG. 2(b).

FIG. 2 is a front view and a side view of a form capable of being formed by a portable telephone related to the embodiment according to a connection state of a first housing 1 and a second housing 2. FIG. 2(*a*) shows a retraction state and FIGS. 2(*b*) and 2(*c*) respectively show extension states extended in different directions.

The retraction state shown in FIG. 2(*a*) is a state in which the whole housing is smallest by relative displacements of the first housing 1 and the second housing 2. When the portable phone is in the retraction state, the portability for the user is excellent.

In the retraction state, as shown in FIG. 2(*a*), the speaker 4, the display unit 3, and the sub key operation unit 5 arranged on an upper face of the first housing 1 are exposed, and the microphone 8 arranged on an upper face of the second housing 2 is exposed.

In the extension state (hereinafter, referred to as first extension state) shown in FIG. 2(*b*), the first housing 1 slides and extends with respect to the second housing 2, such that the key operation unit 7 and the optical sensor 10a arranged on the upper face of the second housing 2 are newly exposed in comparison with the retraction state.

The first extension state can be used in which the key operation unit 7 including an end (call end)/power key, a start (calling) key, and operation keys corresponding to numbers and the like is exposed, and is suitable when a communication function by voice/electronic mail or the like is mainly used.

The first extension state corresponds to a first state of the present invention.

In the extension state (hereinafter, referred to as second extension state) shown in FIG. 2(c), the first housing 1 slides and extends with respect to the second housing 2, such that the color button operation unit 6 and the optical sensor 10b arranged on the upper face of the second housing 2 are newly exposed and the key operation unit 7 exposed in the first extension state is not exposed in the second extension state.

The second extension state can be used in which the color button operation unit 6 is exposed such that a two-way service of the digital broadcast is available.

The second extension state corresponds to a second state of the present invention.

The forms capable of being formed by the portable telephone have been described above. Subsequently, a structure for realizing the plurality of forms (retraction state/first extension state/second extension state) will be described with reference to FIGS. 3 to 5.

Figure 3:
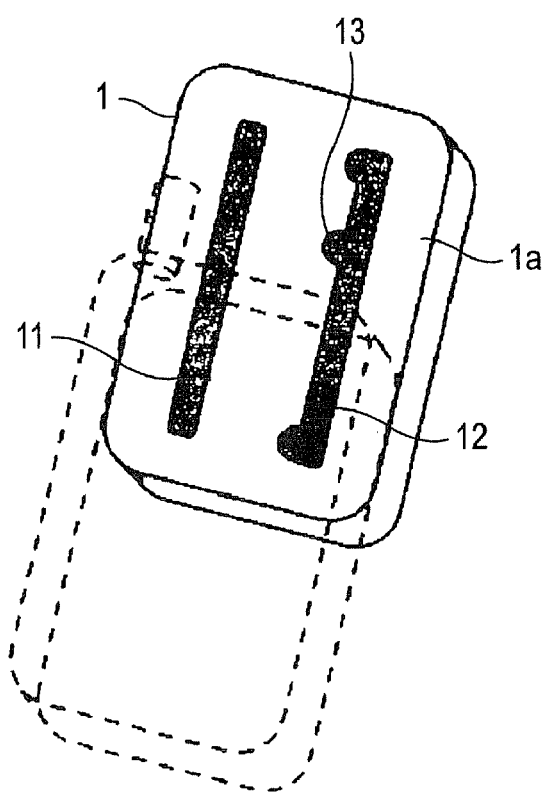
FIG. 3(a) is a view for explaining a slide structure of a first housing and a second housing, and shows a view of a portable telephone seen from a backside.
FIG. 3(b) is a view for explaining a slide structure of a first housing and a second housing, and shows a view of a portable telephone seen from a front side.
Figure 3:
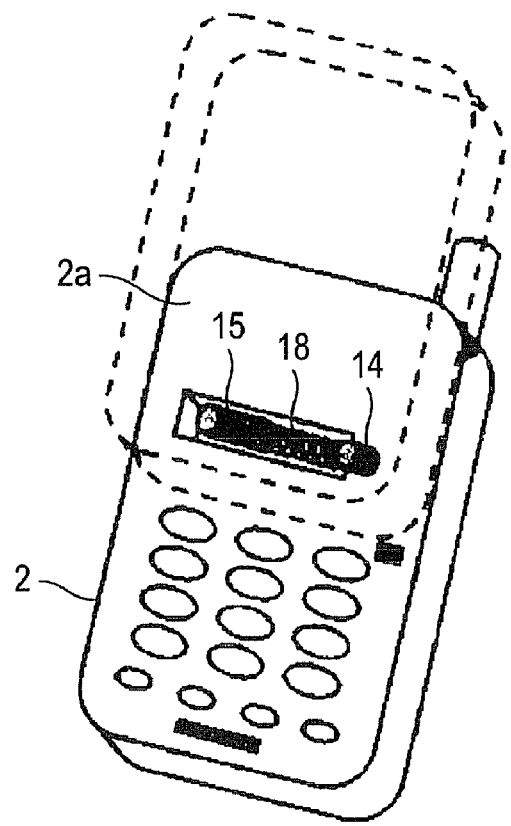

FIG. 3 is a view for explaining a slide structure of the first housing 1 and the second housing 2. FIG. 3(a) shows a view of a portable telephone seen from a backside, and FIG. 3(b) shows a view of a portable telephone seen from a front side. For a better understanding, in FIG. 3(a), the first housing 1 is indicated by the solid line and the second housing 2 is indicated by the dotted line. In FIG. 3(b), the second housing 2 is indicated by the solid line and the first housing 1 is indicated by the dotted line.

As shown in FIG. 3(a), a first slide rail 11 of a linear shape and a second slide rail 12 including a rail groove 13 for regulating relative displacements of the housings are provided on a backside 1a of the first housing 1.

On the other hand, as shown in FIG. 3(b), a fixed pin 14 engaged with the first slide rail 11 and a movable pin 15 engaged with the second slide rail 12 are disposed on a front side 2a of the second housing 2.

That is, the slide rails provided on the backside 1a of the first housing 1 are engaged with the pins provided on the front side 2a of the second housing 2, such that the first housing 1 and the second housing 2 are slidably connected.

The above-described structures provided on the backside 1a of the first housing and the front side 2a of the second housing configure one embodiment of sliding unit of the present invention.

Figure 4:
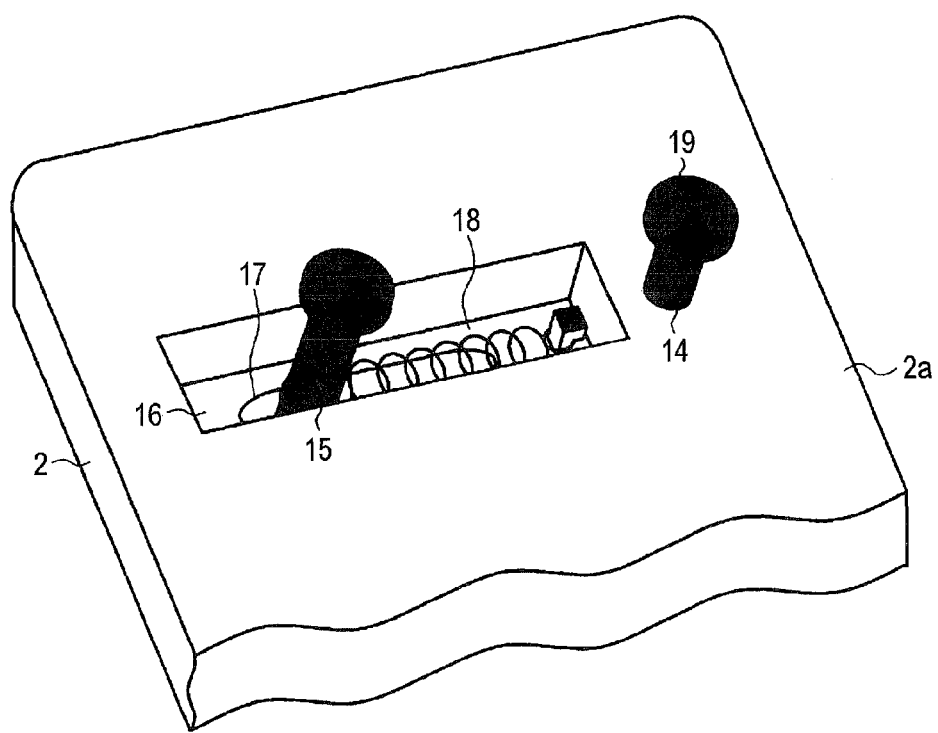
FIG. 4 is a view for explaining one example of a structure of a front side of a second housing.

FIG. 4 is a view for explaining one example of the structure of the front side 2a of the second housing 2.

As shown in FIG. 4, the fixed pin 14 is fixed to the front side 2a of the second housing 2. In a transverse direction of the fixed pin 14, a rectangular concave portion 16 is provided. On a bottom face of the concave portion 16, a sliding hole 17 is provided.

The movable pin 15 is supported by the sliding hole 17 to be perpendicularly displaced along the sliding hole 17. Moreover, the movable pin 15 is attached to one end of the fixed pin 14 side of the concave portion 16 via an elastic member 18 as shown in FIG. 4.

Therefore, the movable pin 15 is configured to be slidable from side to side along the sliding hole 17 within the concave portion 16 in FIG. 4.

On an upper portion of each pin of the fixed pin 14 and the movable pin 15, a circular dropout prevention plate 19 having a larger diameter than the width of each slide rail of the first housing 1 is attached to prevent the second housing 2 from being dropped out from the first housing 1.

Figure 5:
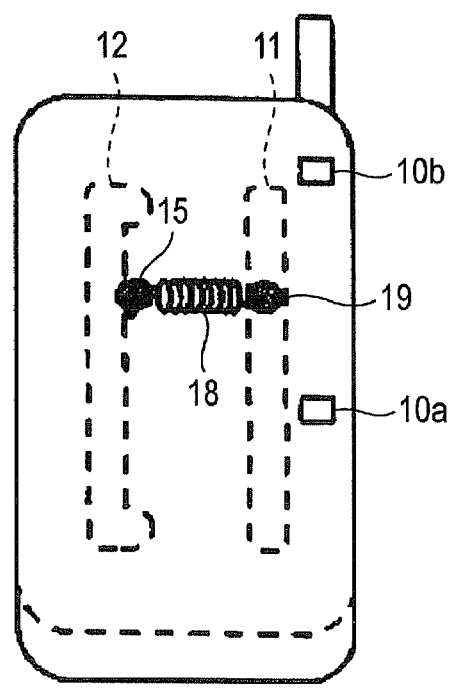
FIG. 5(a) is a view for explaining an operation of a slide mechanism of a portable telephone of the present embodiment, and shows a retraction state.
FIG. 5(b) is a view for explaining an operation of a slide mechanism of a portable telephone of the present embodiment, and shows a state in the middle of extending.
FIG. 5(c) is a view for explaining an operation of a slide mechanism of a portable telephone of the present embodiment, and shows a first extension state.
FIG. 5(d) is a view for explaining an operation of a slide mechanism of a portable telephone of the present embodiment, and shows a second extension state.
Figure 5:
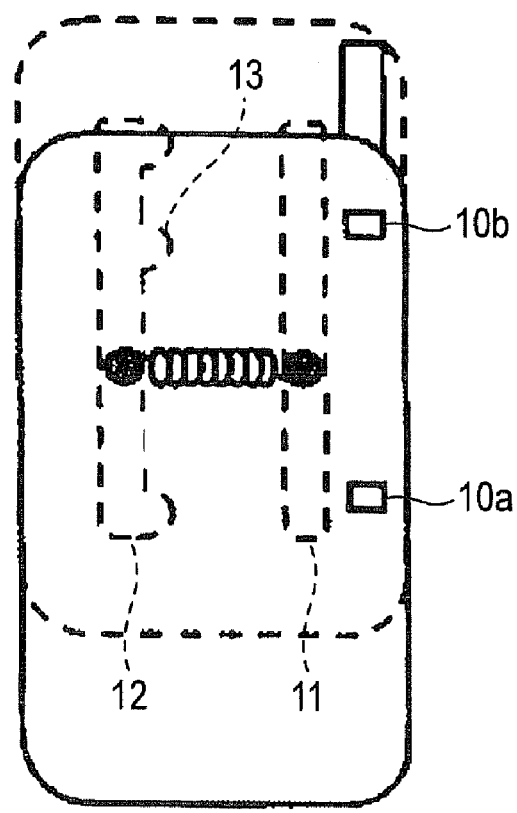
Figure 5:
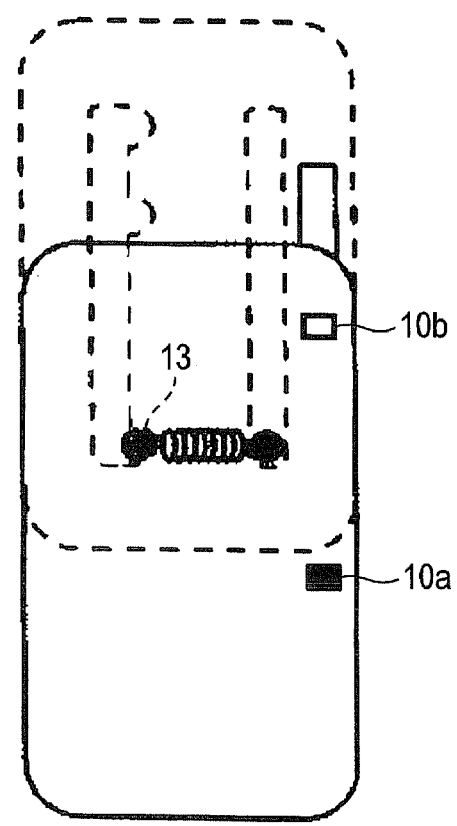
Figure 5:
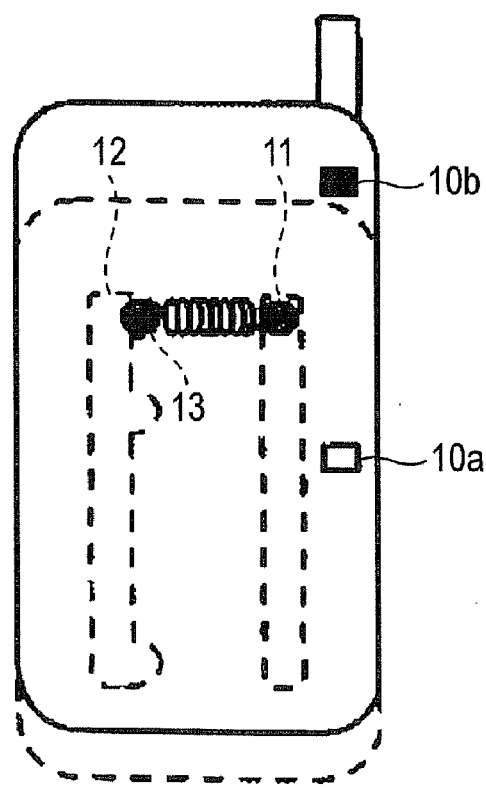

FIG. 5 is a view for explaining an operation of a slide mechanism of a portable telephone of the embodiment. FIG. 5(a) shows a retraction state, FIG. 5(b) shows a state in the middle of extending, FIG. 5(c) shows a first extension state, and FIG. 5(d) shows a second extension state.

In the retraction state shown in FIG. 5(a), the movable pin 15 is fixed in the state engaged with the central rail groove 13 of the second slide rail 12. In this state, for example, the elastic member 18 as a spring is in an extended state rather than the natural length. Since a force is applied in a center direction of the second housing 2, the movable pin 15 is fixed to the central rail groove 13 of the second slide rail 12. Thereby, the whole housing is smallest, such that the portability is excellent.

In the retraction state, as shown in FIG. 5(a), a configuration is made such that both the optical sensors 10a and 10b are not exposed. As a result, a difference between output levels of the sensors does not occur.

When a force is applied to the first housing 1 in an upward direction from the retraction state, the movable pin 15 is separated from the rail groove 13 and is movable along the second slide rail 12 as shown in FIG. 5(b).

When any state is not the first extension state and the second state as shown in FIG. 5(b), a configuration is made such that both the optical sensors 10a and 10b are not exposed as in the retraction state. As a result, a difference between output levels of the sensors does not occur.

When the first housing 1 is further moved in the upward direction from the state of FIG. 5(b), the first extension state is set in which the movable pin 15 is fixed to the rail groove 13 of the lowermost end of the second slide rail 12 as shown in (c). Thereby, the key operation unit 7 including an end (call end)/power key, a start (calling) key, and operation keys corresponding to numbers and the like can be exposed and used, such that the operability is improved when a communication function by voice/electronic mail or the like is mainly used.

As shown in FIG. 5(c) in this state, a configuration is made such that only the optical sensor 10a is exposed and the optical sensor 10b is not exposed. As a result, only the sensor output of the optical sensor 10a has a high level.

When the first housing 1 slides in a reverse direction to the first extension state from the retraction state, the second extension state is set in which the movable pin 15 is fixed to the rail groove 13 of the uppermost end of the second slide rail 12 as shown in FIG. 5(d). Thereby, the color button operation unit 6 is exposed, such that the operability is improved when a two-way service of the digital broadcast is used.

As shown in FIG. 5(d) in this state, a configuration is made such that only the optical sensor 10b is exposed and the optical sensor 10a is not exposed. As a result, only the sensor output of the optical sensor 10b has a high level.

The housing state detection unit 30 detects a housing state (retraction state/first extension state/second extension state) on the basis of sensor outputs of the optical sensors 10a, 10b.

Figure 6:
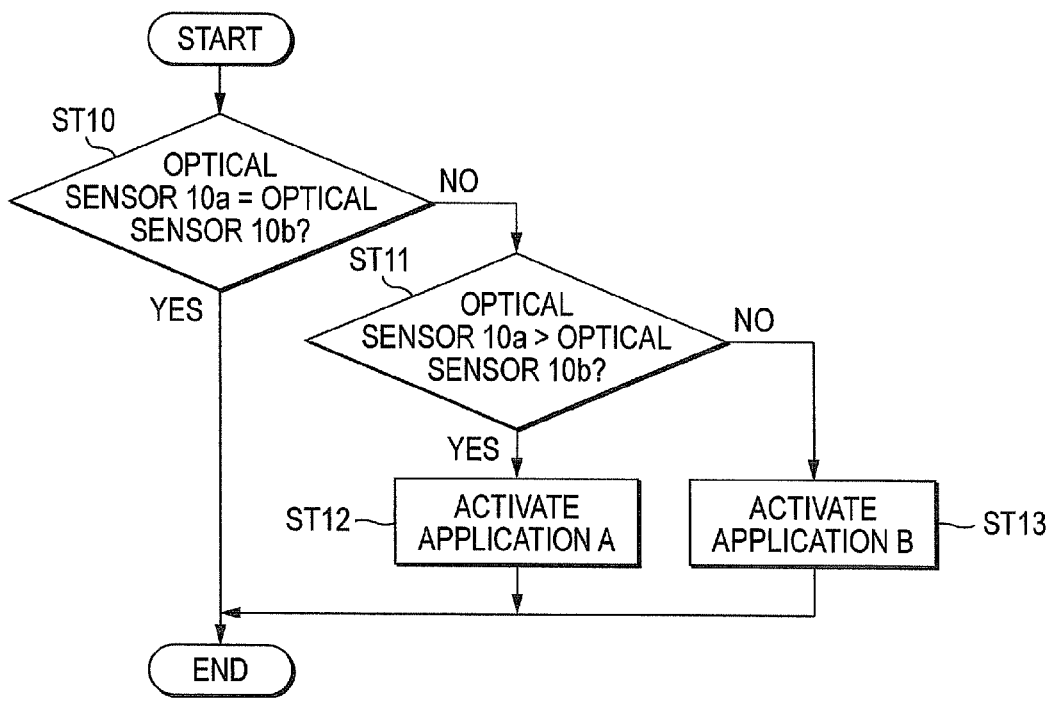
FIG. 6 is a flowchart showing a process in a control unit according to sensor outputs of two optical sensors.

FIG. 6 is a flowchart showing a process in the control unit 22 according to sensor outputs of the optical sensors 11a, 10b.

In FIG. 6, first, the housing state detection unit 30 within the control unit 22 compares outputs of the optical sensors and determines that the housing is not in any state of the first extension state or the second extension state when the outputs of the optical sensors are the same (step ST10). That is, when a positional relationship of the first housing 1 and the second housing 2 is in the state as shown in FIGS. 5(*a*) and (*b*), a difference in all output levels does not occur since the optical sensors 10*a*, 10*b* are not exposed, such that the condition of step ST10 is satisfied.

When the condition of step ST10 is satisfied, the control unit 22 does not perform any operation.

When the sensor output of the optical sensor 10*a* is larger than the sensor output of the optical sensor 10*b* (step ST11), the control unit 22 activates a predetermined application A (step ST12).

That is, in the positional relationship of the first housing 1 and the second housing 2 in the first extension state shown in FIG. 5(*c*), the optical sensor 10*a* is exposed and the optical sensor 10*b* is not exposed, such that only the optical sensor 10*a* has a high output level and the condition of step ST11 is satisfied. In this case, the housing state detection unit 30 detects that the housing is in the first extension state and the control unit 22 activates an application according to detection result. When the application A is already activated, a special new process is not performed.

Since the housing is configured such that the key operation unit 7 is exposed in the first extension state, the user can immediately make a call simultaneously when the housing is extended to the first extension state, for example, if a call function program is registered in advance as the application A.

When the sensor output of the optical sensor 10*a* is smaller than the sensor output of the optical sensor 10*b* (step ST11), the control unit 22 activates a predetermined application B different from the application A (step ST13).

That is, when the positional relationship of the first housing 1 and the second housing 2 is the second extension state shown in FIG. 5(*d*), the optical sensor 10*a* is not exposed and the optical sensor 10*b* is exposed, such that only the optical sensor 10*b* has a high output level and the condition of step ST11 is not satisfied. In this case, the housing state detection unit 30 detects that the housing is in the second extension state and the control unit 22 activates an application according to detection result. When the application B is already activated, a new process is not performed.

Since the housing is configured such that the color button operation unit 6 is exposed in the second extension state, the user can immediately watch a digital broadcast simultaneously when the housing is extended to the second extension state, for example, if a digital broadcast reception program is registered in advance as the application B.

Since the key operation unit 7 is not exposed in the second extension state, an operation key operational at the time of watching the digital broadcast is restricted and the operability of the user is improved. That is, the user is released from the troublesomeness of selecting a necessary key from many operation keys.

Even when the housing is in the retraction state or the first extension sate, a configuration is possible in which the digital broadcast reception program illustrated as the application B is activated by selecting a start menu or the like, but the user can receive the digital broadcast by only sliding from the retraction state to the second extension state when the control unit 22 is configured as described above, such that the operability is improved.

The control unit 22 is configured to terminate the application B at a point of time when the housing state detection unit 30 detects the retraction state or at a point of time when the user operates a specific operation key.

According to the portable telephone related to the present embodiment as described above, the two housings are connected to be extensible in different directions. Since a configuration is made such that only a necessary operation key is exposed according to extension states, the operability of the portable telephone can be significantly improved. Since an unnecessary operation key is not exposed, a wrong operation can be prevented.

According to the portable telephone related to the present embodiment, the housing state (retraction state/first extension state/second extension state) is set in an optimum form depending on functions of the portable telephone, such that both the portability and the function operability can be satisfied.

According to the portable telephone related to the present embodiment, an exposure region of an operation key differs depending on the extension state. On the housing (second housing in the present embodiment) on which operation keys are mainly arranged, necessary operation keys can be effectively laid out.

According to the portable telephone related to the present embodiment, an extension direction of the housing is detected. Since the application is activated depending on the housing state (retraction state/first extension state/second extension state), the user does not need to perform a complicated operation so as to activate the application, and a start time is shortened.

The embodiment of the present invention is not limited to the above-described content, and various modifications are possible in a range without departing from the gist of the present invention.

For example, in the portable telephone related to the above-described embodiment, the housing state detection unit 30 detects the housing state on the basis of outputs of the two optical sensors, but is not limited to the optical sensor and can apply other various sensors. For example, the housing state can be detected by placing three magnetic sensors at positions around three rail grooves of the first housing 1 and placing a magnet on the movable pin 15 of the second housing 2. The housing state can be detected by a potentiometer (variable resistor) arranged along the first slide rail 11.

The housing state has been described in three states of the retraction state, the first extension state, and the second extension state in the portable telephone related to the present embodiment, but can slide from the second extension state to another state.

For example, the case where the digital broadcast reception function is activated in the second extension state of the above-described embodiment has been described, but a broadcast reception state can be improved by providing a third extension state achieved by further sliding in the same direction from the second extension state and varying an antenna length of a digital broadcast reception antenna in the second extension state and the third extension state.

This enables the broadcast reception by the compact second extension state for the purpose of the improvement of the operability, but is aimed to improve the reception sensitivity of broadcast reception by the easy operation of the user while maintaining an advantage of the operability in a reception environment of time-varying broadcast waves.

Figure 7:
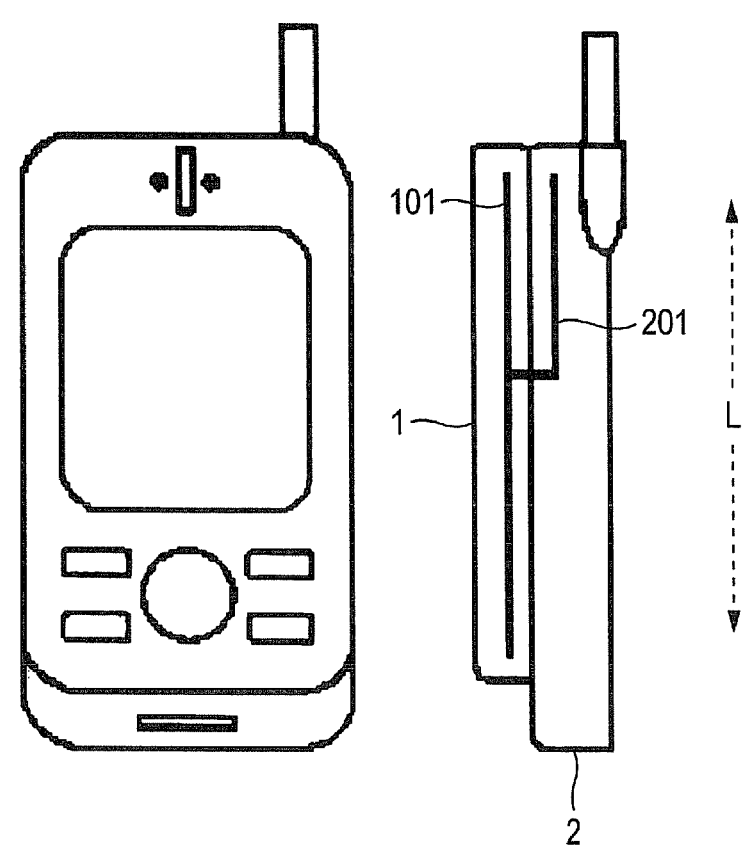
FIG. 7(a) is a view showing an appearance of a portable telephone in which a third extension state is provided and a displacement of a digital broadcast reception antenna in each state, and shows a retraction state.
FIG. 7(b) is a view showing an appearance of a portable telephone in which a third extension state is provided and a displacement of a digital broadcast reception antenna in each state, and shows a first extension state.
FIG. 7(c) is a view showing an appearance of a portable telephone in which a third extension state is provided and a displacement of a digital broadcast reception antenna in each state, and shows a second extension state.
FIG. 7(d) is a view showing an appearance of a portable telephone in which a third extension state is provided and a displacement of a digital broadcast reception antenna in each state, and shows the third extension state.
Figure 7:
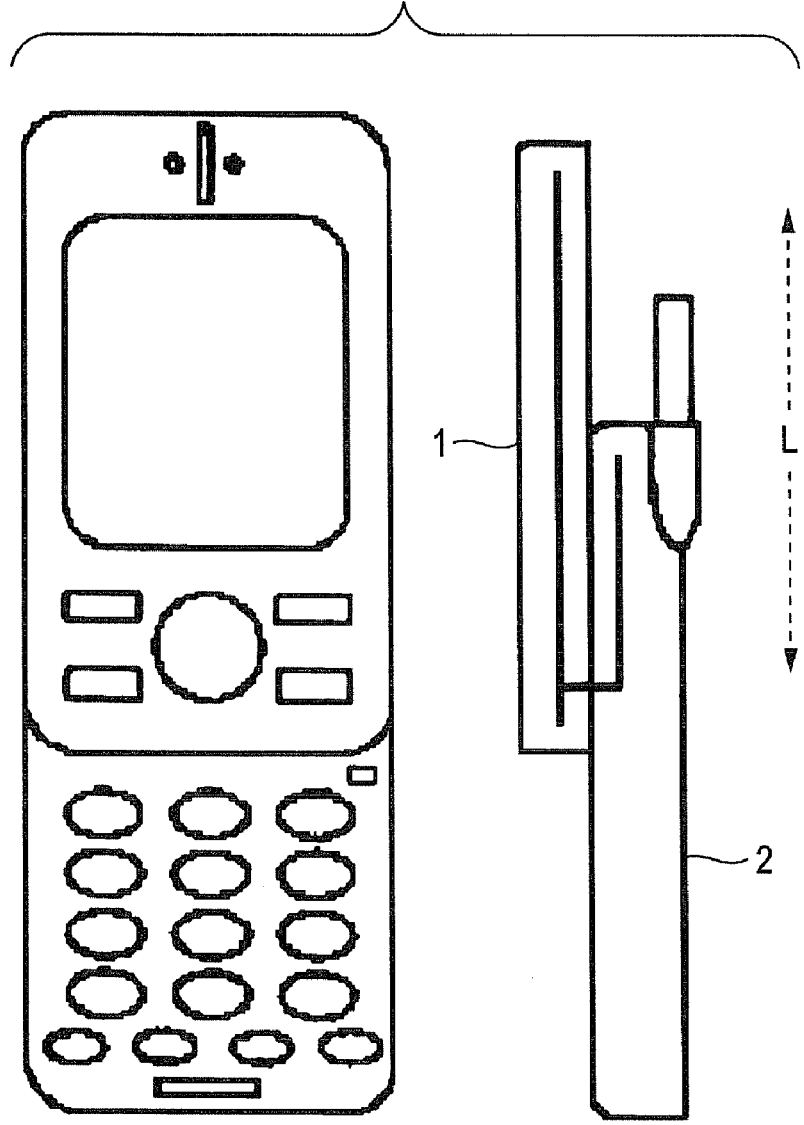
Figure 7:
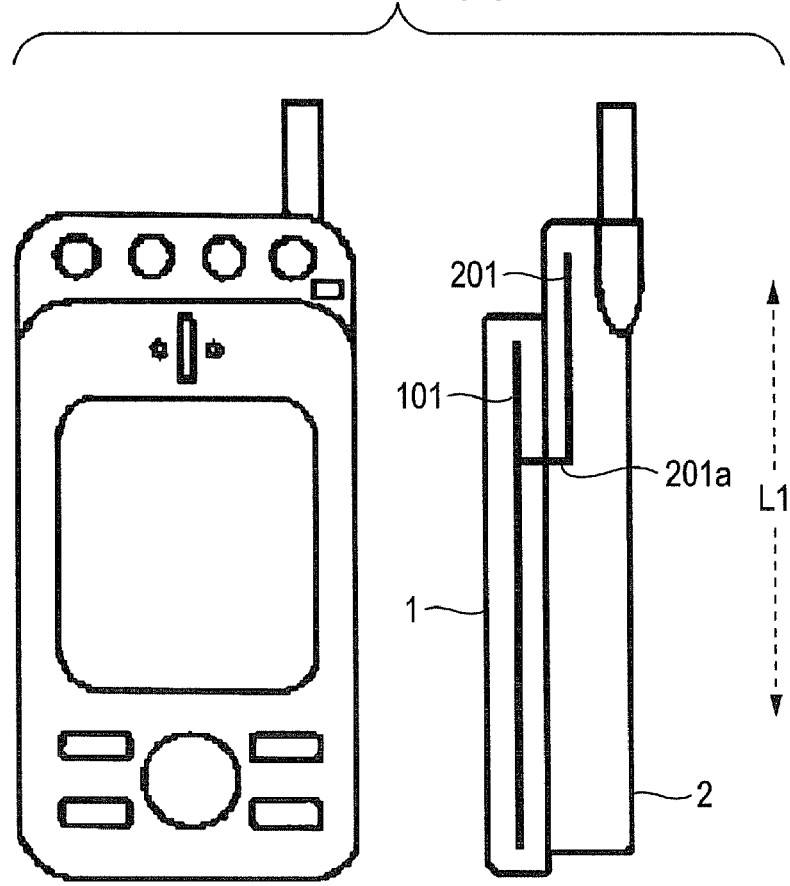
Figure 7:
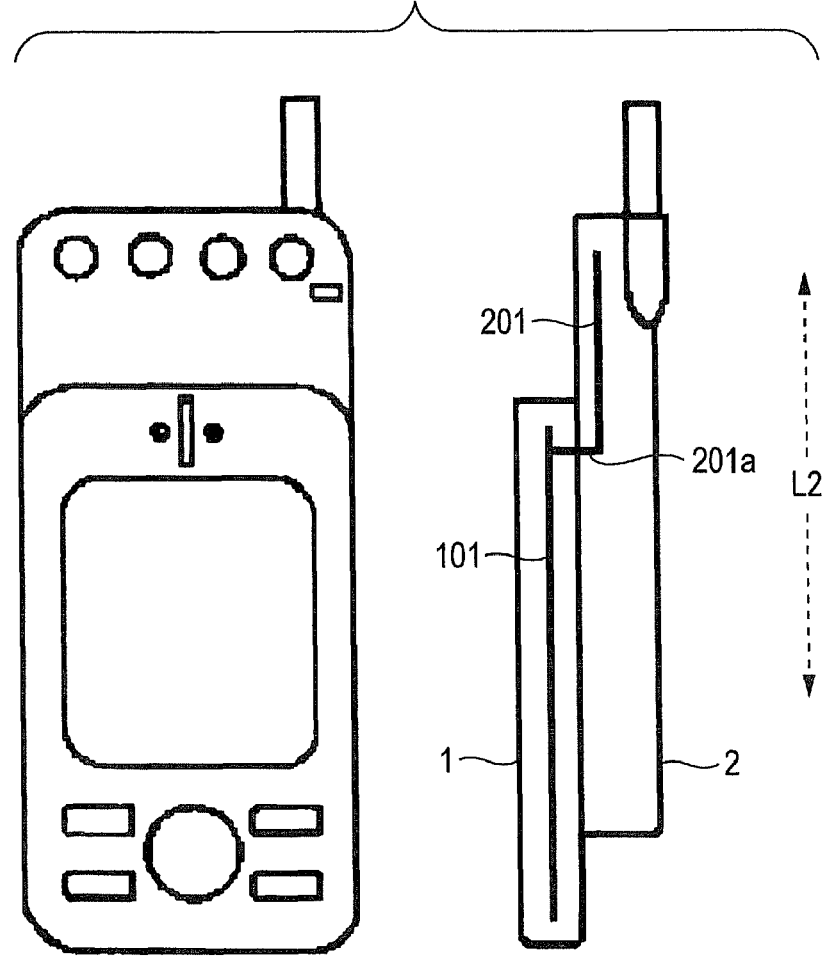

FIG. 7 is a view showing an appearance of a portable telephone in which a third extension state is provided and a situation in which a digital broadcast reception antenna is arranged in each state. FIG. 7(*a*) shows a retraction state, FIG. 7(*b*) shows a first extension state (call), FIG. 7(*c*) shows a second extension state (TV starting/watching), and FIG. 7(*d*) shows a third extension state (TV watching). When the second extension state of FIG. 7(c) is reached, a broadcast application is started and an operation unit to be used for the broadcast application is exposed.

Figure 8:
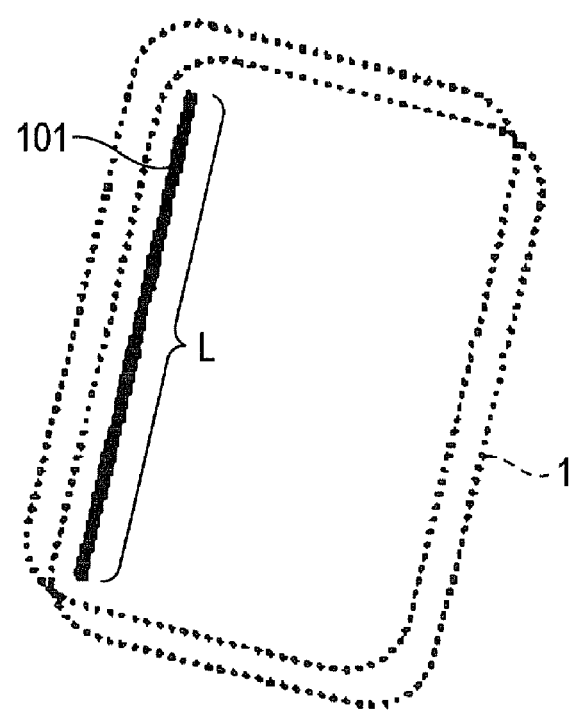
FIG. 8(a) is a view showing a formation example of a first antenna element and a second antenna element placed in a first housing and a second housing, and shows the first antenna element placed in the first housing.
FIG. 8(b) is a view showing a formation example of a first antenna element and a second antenna element placed in a first housing and a second housing, and shows the second antenna element placed in the second housing.
FIG. 8(c) is a view showing a formation example of a first antenna element and a second antenna element placed in a first housing and a second housing, and shows a state in which the first housing and the second housing are slidably placed and a connection state of the first antenna element and the second antenna element.
Figure 8:
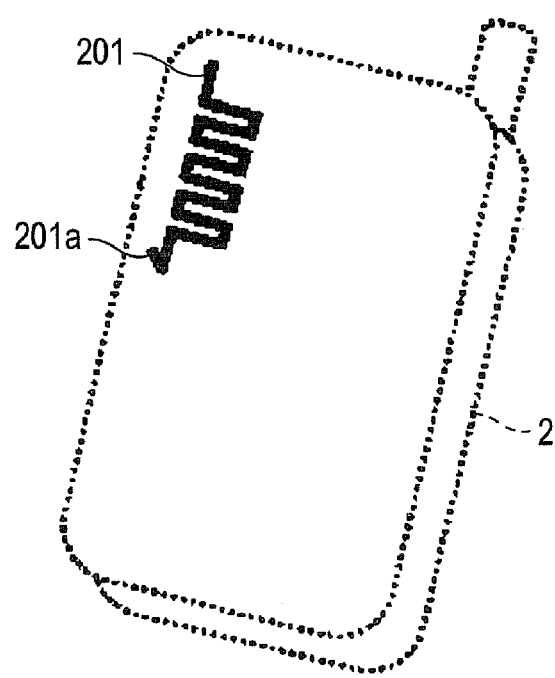
Figure 8:
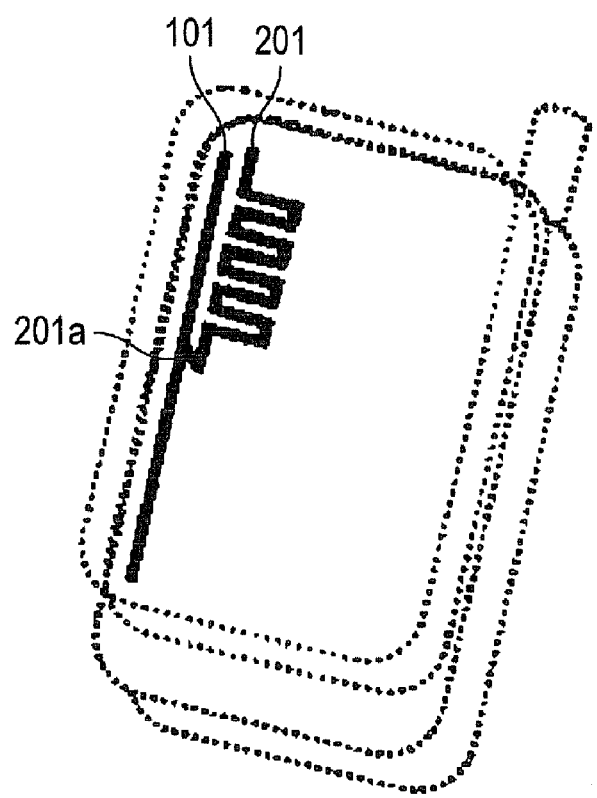

FIG. 8 is a view showing a formation example of a first antenna element and a second antenna element placed on the first housing and the second housing. FIG. 8(a) shows a first antenna element 101 displaced on the first housing, FIG. 8(b) shows a second antenna element 201 displaced on the second housing, and FIG. 8(c) shows connection states of the first antenna element and the second antenna element of the first housing and the second housing slidably placed.

Figure 9:
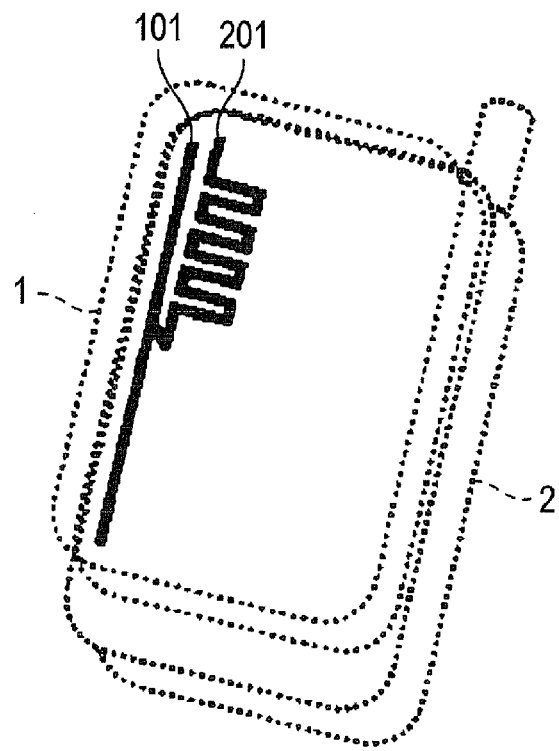
FIG. 9(a) is a view showing a variable state of a digital broadcast reception antenna in each state, and shows a retraction state.
FIG. 9(b) is a view showing a variable state of a digital broadcast reception antenna in each state, and shows a second extension state.
FIG. 9(c) is a view showing a variable state of a digital broadcast reception antenna in each state, and shows a third extension state.
Figure 9:
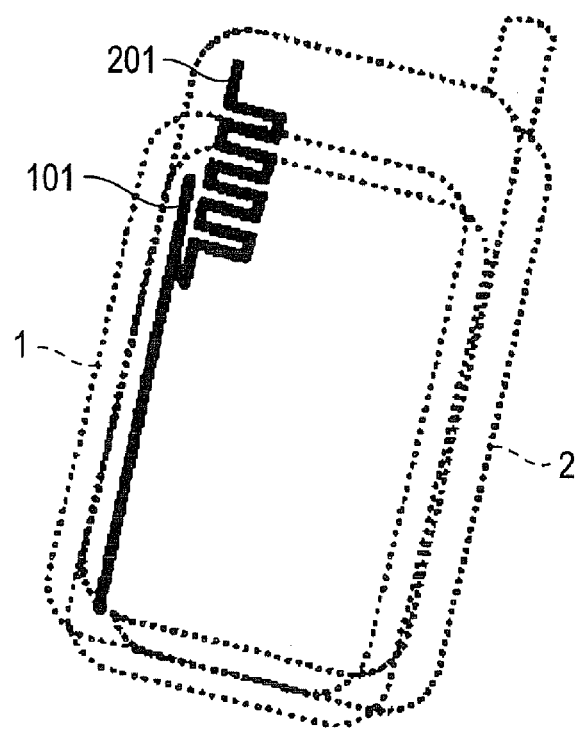
Figure 9:
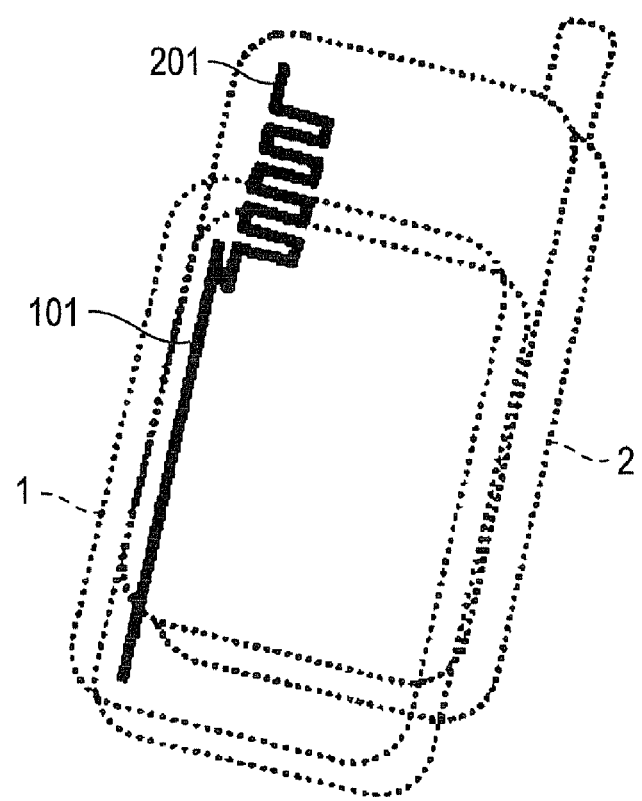

FIG. 9 is a view showing a variable state of the digital broadcast reception in each state. FIG. 9(a) shows a retraction state, FIG. 9(b) shows a second extension state for TV watching, and FIG. 9(c) shows a third extension state for TV watching.

The digital broadcast reception antenna is configured with the first antenna element 101 placed on the first housing 1 and the second antenna element 201 placed on the second housing 2, and is connected to a sliding face side of the first housing 1 and the second housing 2.

As shown in FIGS. 8 and 9, the first antenna element 101 placed on the first housing 1 is formed, for example, in a linear shape (rod shape) of the length L, and the second antenna element 201 placed on the second housing 2 is formed, for example, in a rectangular wave shape.

One end portion 201a of the second antenna element 201 abuts on a side portion of the first antenna element 101, and the one end portion 201a of the second antenna element 201 slides into the side portion of the first antenna element 101 according to operation state of the first housing 1 and the second housing 2.

Thereby, a broadcast reception state is improved by changing the antenna length of the digital broadcast reception antenna in the second extension state and the third extension state.

At a point of time when the portable telephone is in the second extension state and the digital broadcast reception function is started, the digital broadcast reception antenna has the length of L1 as shown in FIG. 7(c). When the first housing 1 further slides from the second extension state, the portable telephone is in the third extension state and the digital broadcast reception antenna has the length of L2 as shown in FIG. 7(d), such that the reception state can be changed. The relationship of antenna lengths of FIGS. 7(b) to (d) is L<L1<L2.

Since the antenna element has a better reception sensitivity in the length L2 than in the length L1, the convenience is further improved, the digital broadcast reception function is started in the second extension state, and the broadcast reception is possible in a better reception state by simply taking the transition from the second extension state to the third extension state in synchronization with a radio wave reception situation.

Thereby, the second extension state is used when the reception state of broadcast waves is good and the third extension state is set, if needed, when the reception state of broadcast waves is not good, a use method can be simply performed depending on the user's situation.

A use configuration of the second extension state in the portable telephone related to the above-described embodiment has been described as the case where the digital broadcast is watched, but is not limited to the digital broadcast and is applicable to other various applications. When the digital broadcast is watched in the retraction state, a function for making a change to a data broadcast by setting the extension state is included.

Figure 10:
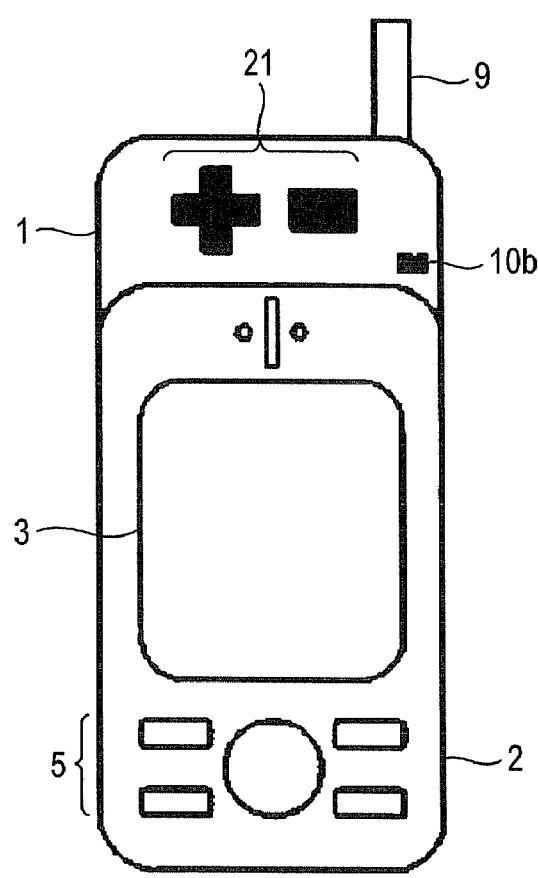
FIG. 10(a) is an appearance of a portable telephone when a use configuration in a second extension state is camera photography, and shows a front view.
FIG. 10(b) is an appearance of a portable telephone when a use configuration in a second extension state is camera photography, and shows a side view.
FIG. 10(c) is an appearance of a portable telephone when a use configuration in a second extension state is camera photography, and shows a rear view.
Figure 10:
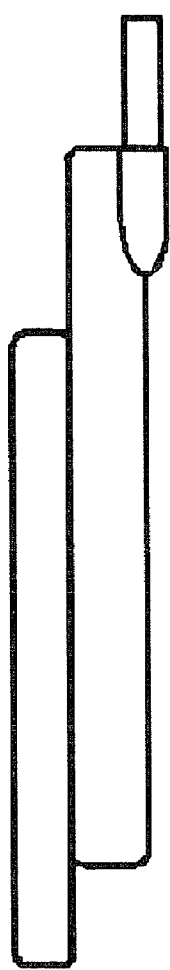
Figure 10:
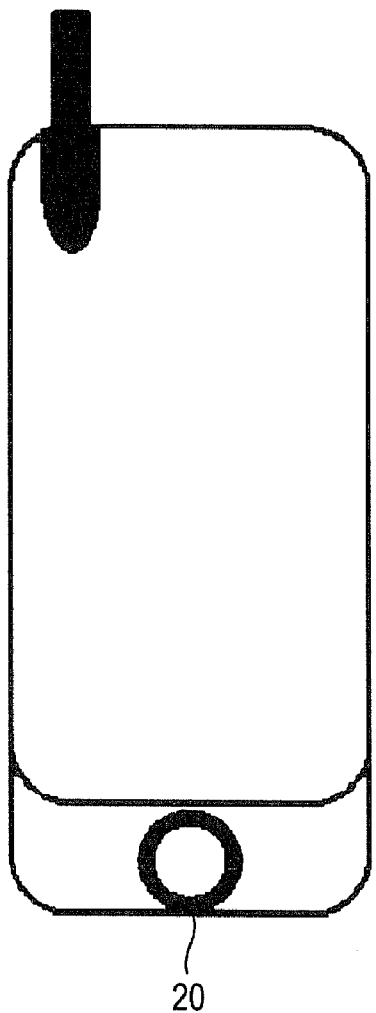

For example, FIG. 10 illustrates an appearance of a portable telephone when a use configuration of a second extension state is camera photography. FIG. 10(a) shows a front view, FIG. 10(b) shows a side view, and FIG. 10(c) shows a rear view. The retraction state and the first extension state are the same as those of the above-described embodiment.

The portable telephone shown in FIG. 10 has an image pickup function. When the second extension state is set, the image pickup function is started and a camera operation button 21 is exposed on the first housing. The camera operation button 21 is assigned a function required when the portable telephone is used as a digital camera to switch a photography mode or a photographed image size, or the like.

As shown in FIG. 10(c), a photography lens of an image pickup unit 20 is exposed on the backside by setting the second extension state.

When the above-described configuration is made, the portable telephone shown in FIG. 10 is set from the retraction state to the second extension state and components configuring the image pickup function are exposed, such that the excellent portability is made in the retraction state. Since the key operation unit 7 unnecessary for the camera photography is not exposed in the second extension state and only the camera operation button 21 necessary for the camera photography is exposed, the camera photography operability is improved.

As in the portable telephone related to the above-described embodiment, the optical sensors 10a, 10b and the extension direction detection unit 30 are provided. When the extension direction detection unit 30 detects the second extension state, the control unit 22 operates a camera photography function and displays an image picked up by the image pickup unit 20 on the display unit 3. Thereby, the camera photography function can be quickly started and a complicated operation for starting the camera photography function is unnecessary.

In the portable telephone related to the above-described embodiment, the first housing 1 and the second housing 2 extend in opposite directions on the same line to form the first extension state and the second extension state, but can be configured to extend in directions that are not on the same line.

Figure 11:
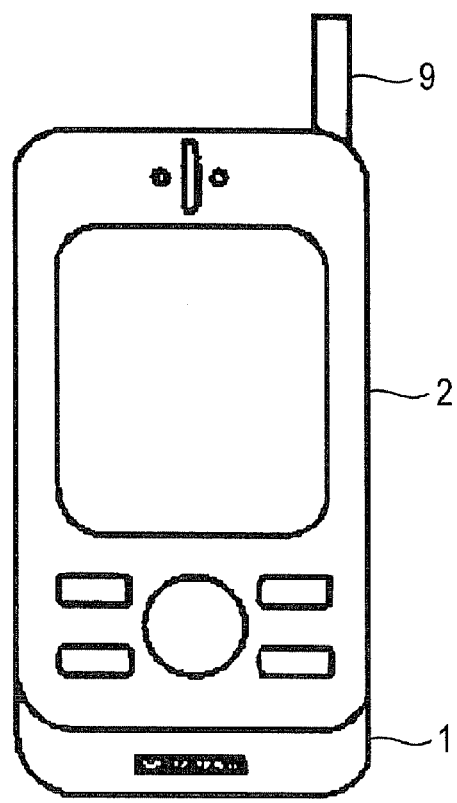
FIG. 11(a) is a front view of a portable telephone in which two extension directions are different from each other, and shows a retraction state.
FIG. 11(b) is a front view of a portable telephone in which two extension directions are different from each other, and shows a first extension state.
FIG. 11(c) is a front view of a portable telephone in which two extension directions are different from each other, and shows a second extension state.
Figure 11:
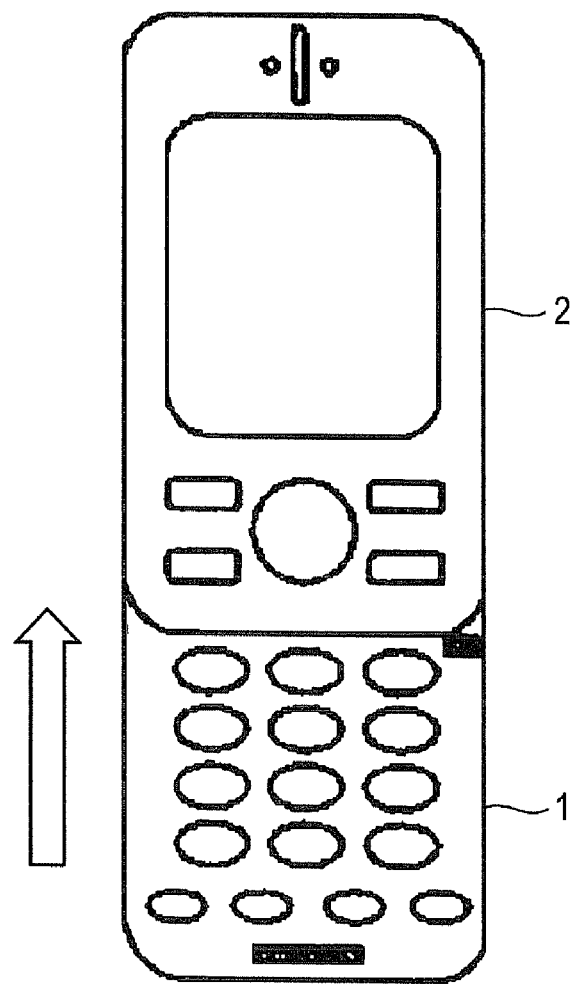
Figure 11:
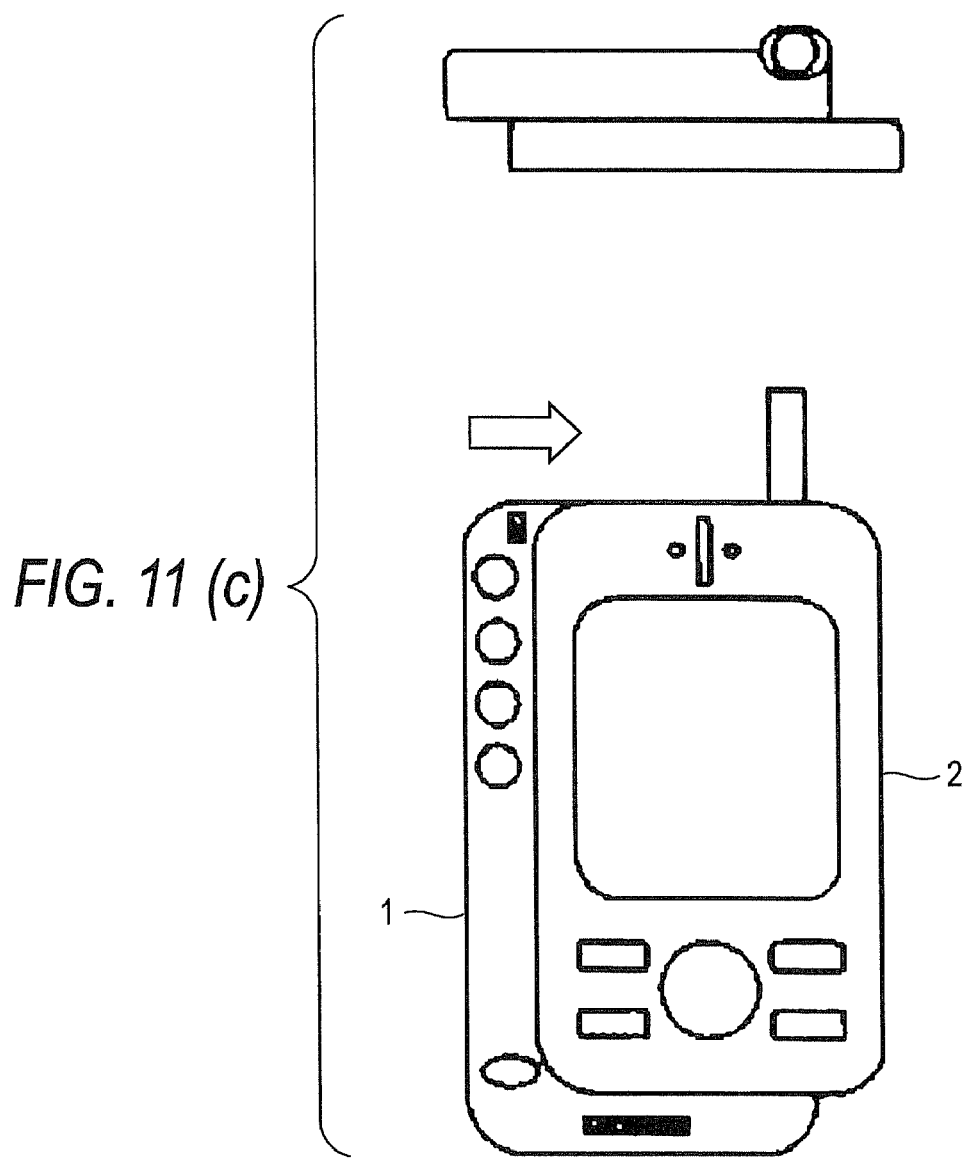

FIG. 11 is a front view of a portable telephone in which two extension directions are not on the same line. FIG. 11(a) shows a retraction state, FIG. 11(b) shows a first extension state, and FIG. 11(c) shows a second extension state.

In the second extension state shown in FIG. 11(c) different from the second extension state described with reference to FIG. 2(c), the first housing 1 extends in a transverse direction from the retraction state. Thereby, as compared with the state shown in FIG. 11(c), the region to be exposed on the first housing 1 can be changed and the operation keys can be arranged in a longitudinal direction. Therefore, the housing is laterally set and is easy to be used for digital broadcast watching.

Of course, an L-shaped slide rail rather than the linear slide rail shown in FIG. 3 is required to enable the extension operation shown in FIG. 11.

As described above, the extension directions are not necessarily on the same line, and the operation keys can be optimally arranged according to an application corresponding to the second extension state.

An operation key required for the digital broadcast is a display/non-display button for a multimedia data broadcast. This key can also be exposed as the operation key for the digital broadcast in the second extension state.

Of course, the digital broadcast includes terrestrial digital and satellite digital broadcasts, and the like. The embodiment has been described using the digital broadcast, but is not limited thereto, and can be an analog broadcast. Moreover, broadcasts of a radio broadcast and the like are included.

While the present invention has been described in detail with reference to certain embodiments, it will be understood by those skilled in the art that various changes and modifications may be made therein without departing from the spirit and scope of the present invention.

This application claims priority to Japanese Patent Application No. 2005-285663 filed on Sep. 29, 2005, the entire disclosure of which is hereby incorporated by reference.

The invention claimed is:

1. A portable terminal comprising:
a first housing on which a display screen is exposed and arranged;
a second housing including at least a plurality of operation keys; and
a sliding unit that forms a retraction state in which a whole form is retracted,
a first extension state extending in a first direction from the retraction state,
a second extension state extending in a second direction from the retraction state, by sliding the second housing with respect to the first housing, wherein the first direction is the opposite direction from the second direction, and
a third extension state further extending in the second direction from the second extension state;
wherein antenna lengths of an antenna are configured to be different in the first extension state, the second extension state and the third extension state.

* * * * *